May 23, 1933.  L. L. MELLOR  1,910,492
OPTICAL SYSTEM FOR PHOTOGRAPHY
Filed April 15, 1931
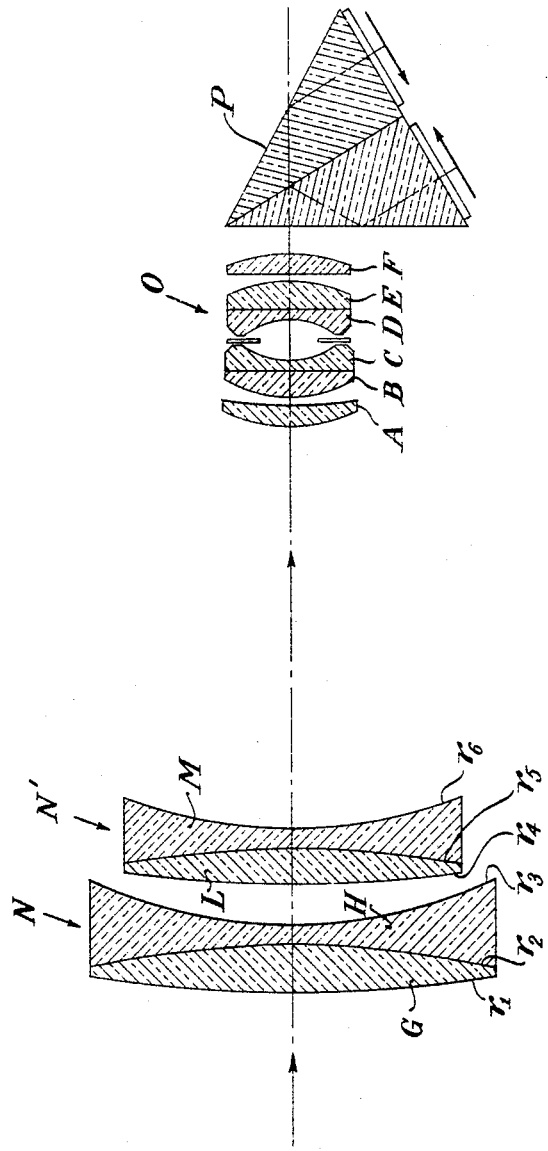
Inventor,
Lewis L. Mellor,
by Roberts, Cushman & Woodberry
Attys.

Patented May 23, 1933

1,910,492

UNITED STATES PATENT OFFICE

LEWIS L. MELLOR, OF LOS ANGELES, CALIFORNIA, ASSIGNOR, BY MESNE ASSIGNMENTS, TO TECHNICOLOR, INC., OF NEW YORK, N. Y., A CORPORATION OF DELAWARE

OPTICAL SYSTEM FOR PHOTOGRAPHY

Application filed April 15, 1931. Serial No. 530,177.

In the art of photography it is often desirable to obtain great depth of focus and large covering power and sometimes to obtain more space between the lens and the focal plane as, for example, in color cinematographic cameras, using prism sets or other means for dividing the image-bearing beam into component beams with which to obtain simultaneous images representing different color aspects of the object-field, where considerable space is required for the light-dividing means between the objective lens and the focal plane or planes.

Objects of the present invention are to accomplish the aforesaid results and at the same time to minimize aberrations and distortion, particularly chromatic difference of focus and of magnification and barrel-shaped distortion.

For the purpose of illustration a typical embodiment of the invention is shown in the accompanying drawing which is an axial section of a complete optical system comprising an objective O formed of six elements A, B, C, D, E and F, a light-dividing prism unit P between the objective and the focal plane defined by the arrows and two negative lenses N and N′ formed of elements G, H, L and M.

In the particular embodiment chosen for the purpose of illustration the prism set is of the type claimed in the patent to Comstock 1,497,357 and the lenses are constructed as follows:

OBJECTIVE 52 mm. F/2

| Elements | Axial thickness in mm. | Glass N. D. | Glass V. | Diameter in inches | Radius of curvature in mm. |
|---|---|---|---|---|---|
| A | 4.06 | 1.613 | 59.0 | 1.05 | Front—33.53 Rear—153.40 |
| B | 5.08 | 1.613 | 59.0 | 1.00 | Front—22.86 Rear—Flat |
| C | 2.03 | 1.575 | 41.4 | 1.00 | Front—Flat Rear—14.73 |
| D | 2.03 | 1.575 | 41.4 | .95 | Front—14.73 Rear—Flat |
| E | 7.11 | 1.613 | 59.0 | .95 | Front—Flat Rear—19.81 |
| F | 4.06 | 1.613 | 59.0 | .95 | Front—Flat Rear—35.01 |

Axial distance between A and B and between E and F = 0.76 mm.

Axial distance between diaphragm plane and C and D = 3.55 mm.

NEGATIVE LENSES

—163.0 mm. focal length
—165.6 mm. back focus

| Elements | Axial thickness in mm. | Glass N. D. | Glass V. |
|---|---|---|---|
| G | 8.5 | 1.617 | 36.7 |
| H | 4.0 | 1.523 | 58.0 |
| L | 6.5 | 1.617 | 36.7 |
| M | 4.0 | 1.523 | 58.0 |

| Surface | Radius of curvature in mm. | Dioptric power |
|---|---|---|
| $r_1$ | +315.0 | +1.95 |
| $r_2$ | −188.0 | +0.49 |
| $r_3$ | +95.0 | −5.50 |
| $r_4$ | +315.0 | +1.95 |
| $r_5$ | −188.0 | −0.49 |
| $r_6$ | +95.0 | −5.50 |
| Total dioptric power | | −6.12 |

Air space between N and N′ 8.0 mm.
Air space between N and O 90.0 mm.

In its various aspects this invention involves the following characteristics: The negative lens combination is spaced from the objective a distance (90.0 mm. in the illustration) at least of the order of the focal length of the objective. One surface of the negative lens combination ($r_1$ and/or $r_4$) is convex and directed away from the objective and another surface ($r_3$ and/or $r_6$) is concave and directed toward the objective. The power of the concave surface is at least of the order of twice but preferably less than three and one-half times the power of the convex surface, the ratio being almost three to one in the illustration. The focal length of the negative combination is preferably numerically at least three times that of the positive lens. Thus the construction is preferably such that the negative lens combination produces substantially no distortion (less than twenty parts in one thousand) nor chromatic error of magnification, the positive and negative elements G, H, L and M correcting for chromatic difference of focus and of magnification. The negative lens combination tends to counteract the aberrations of the prism set, particularly because of the location of the concave surfaces $r_3$ and $r_6$ at the rear, and thus assists in correcting the prism set.

By this arrangement the equivalent focal length of the system may be decreased a much larger percentage than the back focal length, thereby affording a larger space between the objective and the focal plane for any chosen focal length. By using two negative lenses (with their elements cemented together or uncemented) instead of one, a much stronger effect can be produced without involving excessive curvature of surfaces. The negative lenses N and N' are preferably corrected substantially independently of the positive lens O; the negative element is subdivided into several lens elements separated by air lenses and composed of different kinds of glasses for the purpose of correction, the combined effect being that of a meniscus furnishing a substantially correct and undistorted virtual image.

It should be understood that the present disclosure is for the purpose of illustration only and that this invention includes all modifications and equivalents which fall within the scope of the appended claims.

I claim:

1. A photographic lens system comprising an objective, means in front of the objective for decreasing the equivalent focal length of the system a larger percentage than the back focal length, said means comprising two lenses at least one of which is a negative lens spaced from the objective a distance at least of the order of the focal length of the objective, the negative lens comprising different positive and negative elements to correct for chromatic difference of focus and of magnification, one surface of the negative lens being convex and directed away from the objective and another surface of the negative lens being concave and directed toward the objective, and the power of said concave surface being at least of the order of twice but less than three and one-half times the power of the convex surface.

2. A photographic lens system comprising an objective, means in front of the objective for decreasing the equivalent focal length of the system a larger percentage than the back focal length, said means comprising two lenses at least one of which is a negative lens spaced from the objective a distance at least of the order of the focal length of the objective, the negative lens comprising different positive and negative elements cemented together to correct for chromatic difference of focus and of magnification, one surface of the negative lens being convex and directed away from the objective and another surface of the negative lens being concave and directed toward the objective, and the power of said concave surface being at least of the order of twice, but less than three and one-half times the power of the convex surface.

3. A photographic lens system comprising an objective, means in front of the objective for decreasing the equivalent focal length of the system a larger percentage than the back focal length, said means comprising two lenses each of which is a negative lens spaced from the objective a distance at least of the order of the focal length of the objective, at least one of the negative lenses comprising different positive and negative elements to correct chromatic difference of focus and of magnification, one surface of the latter lens being convex and directed away from the objective and another surface of the lens being concave and directed toward the objective, and the power of said concave surface being at least of the order of twice, but not more than three and one-half times the power of the convex surface.

4. A photographic lens system comprising an objective, means in front of the objective for decreasing the equivalent focal length of the system a larger percentage than the back focal length, said means comprising two lenses each of which is a negative lens spaced from the objective a distance at least of the order of the focal length of the objective, at least one of the negative lenses comprising different positive and negative elements cemented together to correct for chromatic difference of focus and of magnification, one surface of the latter lens being convex and directed away from the objective and another surface of the lens being concave and directed toward the objective, and the power of said concave being at least of the order of twice, but not more than three and one-half times the power of the convex surface.

5. A photographic lens system comprising an objective, means in front of the objective for decreasing the equivalent focal length of the system a larger percentage than the back focal length, said means comprising two lenses each of which is a negative lens spaced from the objective a distance at least of the order of the focal length of the objective, each negative lens comprising different positive and negative elements to correct for chromatic difference of focus and of magnification, one surface of each lens being convex and directed away from the objective and another surface of each lens being concave and directed toward the objective, and the power of each concave surface being at least of the order of twice the power of the corresponding convex surface.

6. A photographic lens system comprising an objective, means in front of the objective for decreasing the equivalent focal length of the system a larger percentage than the back focal length, said means comprising two lenses each of which is a negative lens spaced from the objective a distance at least of the order of the focal length of the objective, each negative lens comprising different positive and negative elements cemented together to correct for chromatic difference of focus and of magnification, one surface of each lens being convex and directed away from the objective and another surface of each lens being concave and directed toward the objective, and the power of each concave surface being at least of the order of twice the power of the corresponding convex surface.

7. A photographic lens system comprising an objective, light-dividing means intermediate the positive lens and the focal plane of the lens, lenses in front of the objective with an air space therebetween, said lenses comprising a negative lens spaced from the objective a distance at least of the order of the focal length of the objective, the negative lens comprising different positive and negative elements to correct for chromatic difference of focus and of magnification, one surface of the negative lens being convex and directed away from the objective and another surface of the negative lens being concave and directed toward the objective, and the power of said concave surface being at least of the order of twice, but not more than three and one-half times the power of the convex surface, whereby more space is available for said light-dividing means.

8. A photographic lens system comprising an objective and, in front thereof at a distance at least of the order of the focal length of said objective, a lens combination producing a negative meniscus effect, said lens combination comprising lenses separated by air spaces and having a focal length of at least three times the focal length of said objective.

9. A photographic lens system comprising an objective and, in front thereof at a distance at least of the order of the focal length of said objective, a lens combination producing a negative meniscus effect, said lens combination being corrected for color and distortion and comprising two lenses forming an intermediate air lens and having a focal length of at least three times the focal length of said objective.

10. A photographic lens system comprising an objective and, in front thereof at a distance at least of the order of the focal length of said objective, a negative lens combination producing a negative meniscus effect, said lens combination comprising two combined lenses of which at least one is negative, said combined lenses forming an intermediate positive air lens and having a focal length of at least three times the focal length of said objective.

11. A photographic lens system comprising an objective and, in front thereof at a distance at least of the order of the focal length of said objective, a lens combination producing a negative meniscus effect, said lens combination comprising two lenses, at least one of said combined lenses being negative meniscus shaped, the surfaces concave towards the objective being of at least approximately twice but not more than three and one-half times the power of the other surfaces.

12. In a photographic lens system, in combination an objective and in front thereof at a distance at least of the order of the focal length of said objective a composite negative lens system comprising two lenses separated by an air space and having a focal length at least of the order of three times the focal length of said objective and comprising a negative meniscus with its concave face towards said objective.

13. In a photographic lens system, in combination an objective and in front thereof at a distance at least of the order of the focal length of said objective a negative lens system comprising two lenses separated by an air space and having a focal length of at least three times the focal length of said objective.

14. In a photographic lens system, in combination an objective and in front thereof at a distance at least of the order of the focal length of said objective a negative lens system comprising two lenses separated by an air space and having a focal length of at least three times the focal length of said objective, and comprising at least one negative meniscus with its convex surface towards said objective, the ratio in dioptric power between the convex and the other surface of said meniscus being three and one-half to one or less.

15. In a photographic lens system, in combination an objective and in front thereof at a distance at least of the order of the focal length of said objective a negative lens system having a focal length of at least three times the focal length of said objective, and comprising two negative meniscus doublets with their convex surfaces towards said objective.

16. In a photographic lens system, in combination an objective and in front thereof at a distance at least of the order of the focal length of said objective a negative lens system having a focal length of at least three times the focal length of said objective, and comprising two negative meniscus doublets with their convex surfaces towards said objective and separated by an air space, the ratio in dioptric power between the convex and the other surfaces of said doublets being three and one-half to one or less.

17. In a photographic lens system, in combination light dividing means, in front thereof an objective, and in front of the objective at a distance at least of the order of the focal length of said objective a negative lens system having a focal length of at least three times the focal length of said objective, and comprising two negative meniscus doublets with their convex surfaces towards said objective, the ratio in dioptric power between the convex and the other surfaces of said doublets being three and one-half to one or less.

18. A photographic lens system comprising an objective, means in front of the objective for decreasing the equivalent focal length of the system a larger percentage than the back focal length, said means comprising two lenses each of which is a negative lens spaced from the objective a distance at least of the order of the focal length of the objective, each negative lens comprising different positive and negative elements cemented together to correct for chromatic difference of focus and of magnification, one surface of each lens being convex and directed away from the objective and another surface of each lens being concave and directed toward the objective, and the power of each concave surface being at least of the order of twice but not more than three and one-half times the power of the convex surface of the same lens.

Signed by me at Hollywood, California, this twenty-eighth day of March, 1931.

LEWIS L. MELLOR.